United States Patent
Schiemann et al.

(10) Patent No.: US 7,207,133 B2
(45) Date of Patent: Apr. 24, 2007

(54) TIP-UP DEVICE

(76) Inventors: Linda Schiemann, 1808 Kollen, Saginaw, MI (US) 48602; Richard E. Schiemann, 4342 Chappel, Gladwin, MI (US) 48624

( * ) Notice: Subject to any disclaimer, the term of this patent is extended or adjusted under 35 U.S.C. 154(b) by 46 days.

(21) Appl. No.: 11/042,613

(22) Filed: Jan. 25, 2005

(65) Prior Publication Data

US 2005/0166442 A1   Aug. 4, 2005

Related U.S. Application Data

(60) Provisional application No. 60/542,110, filed on Feb. 4, 2004.

(51) Int. Cl.
*A01K 97/12* (2006.01)
(52) U.S. Cl. ......................................................... 43/17
(58) Field of Classification Search .................... 43/17, 43/16; 340/984, 539.1, 540, 332, 686.1, 340/393.3, 392.1, 569
See application file for complete search history.

(56) References Cited

U.S. PATENT DOCUMENTS

| | | | |
|---|---|---|---|
| 1,737,921 A * | 12/1929 | Derr | 43/17 |
| 2,170,000 A * | 8/1939 | Eggleston | 43/17 |
| 2,654,176 A | 10/1953 | Kachelski et al. | |
| 2,714,270 A * | 8/1955 | Premo | 43/17 |
| 2,741,054 A * | 4/1956 | Brundage | 43/17 |
| 2,785,493 A * | 3/1957 | Thiel | 43/17 |
| 2,816,280 A * | 12/1957 | Detweiler | 340/392.1 |
| 2,834,140 A * | 5/1958 | Knier | 43/17 |
| 3,114,141 A * | 12/1963 | Gerace | 340/569 |
| 3,261,010 A * | 7/1966 | Kardel | 340/546 |
| 3,359,673 A | 12/1967 | Roemer | |
| 3,378,945 A * | 4/1968 | Johnson | 43/17 |
| 3,440,753 A * | 4/1969 | Kelley | 43/17 |
| 3,474,561 A * | 10/1969 | McConkey | 43/16 |
| 3,611,333 A * | 10/1971 | Conigliaro | 340/569 |
| 3,727,342 A * | 4/1973 | Lindsey, Jr. | 43/17 |
| 3,796,958 A * | 3/1974 | Johnston et al. | 340/539.1 |
| 3,827,038 A * | 7/1974 | Willis | 340/539.1 |
| 3,878,539 A * | 4/1975 | Gooding | 340/521 |
| 3,938,120 A * | 2/1976 | O'Connell | 340/546 |
| 3,999,323 A * | 12/1976 | Vitucci | 43/17 |
| 4,163,225 A * | 7/1979 | Engel | 340/569 |
| 4,258,359 A * | 3/1981 | McLamb | 340/521 |
| 4,437,255 A | 3/1984 | Reed | |
| 4,438,428 A * | 3/1984 | Ober et al. | 340/521 |

(Continued)

FOREIGN PATENT DOCUMENTS

CA    2232803 A1 *  11/1999

(Continued)

*Primary Examiner*—Darren W. Ark
(74) *Attorney, Agent, or Firm*—Robert Stearns; Dickinson Wright PLLC

(57) ABSTRACT

A tip-up fishing device includes a cross frame having a horizontal section that spans a hole cut in the ice and a vertical section that supports a spool of fishing line down in the hole. A trip device operates to release a spring elastic flag pole when a fish strikes the line. The flag pole springs upright and is caused to depress a push-button transmitter switch mounted on the frame. The switch sends a signal to a remote receiver which generates an alarm signal to alert the fisherman.

8 Claims, 2 Drawing Sheets

U.S. PATENT DOCUMENTS

| | | | |
|---|---|---|---|
| 4,484,181 A * | 11/1984 | Schwartz | 340/521 |
| 4,520,350 A * | 5/1985 | Huang | 340/569 |
| 4,633,608 A | 1/1987 | Savarino | |
| 4,790,099 A * | 12/1988 | Miller, Jr. | 43/17 |
| 4,808,974 A * | 2/1989 | Cantley | 340/546 |
| 4,928,419 A * | 5/1990 | Forrestal | 43/17 |
| 4,996,788 A * | 3/1991 | Wieting et al. | 43/17 |
| 5,067,269 A * | 11/1991 | Eppley et al. | 43/17 |
| 5,074,072 A * | 12/1991 | Serocki et al. | 43/17 |
| 5,097,618 A * | 3/1992 | Stoffel | 43/17 |
| 5,155,470 A * | 10/1992 | Tuttle | 340/539.1 |
| 5,239,305 A * | 8/1993 | Murphy et al. | 340/539.1 |
| 5,274,944 A | 1/1994 | Laessig | |
| 5,303,677 A * | 4/1994 | Jones | 340/573.3 |
| 5,475,369 A * | 12/1995 | Baker | 340/539.1 |
| 5,488,796 A | 2/1996 | Taylor et al. | |
| 5,604,478 A * | 2/1997 | Grady et al. | 340/539.1 |
| 5,896,694 A * | 4/1999 | Midha | 43/17 |
| 6,028,504 A * | 2/2000 | Segan | 340/328 |
| 6,088,945 A * | 7/2000 | Sanderfoot | 43/17 |
| 6,170,189 B1 * | 1/2001 | Klein | 43/17 |
| 6,433,692 B1 * | 8/2002 | Kenum | 340/328 |
| 6,487,812 B2 * | 12/2002 | Johnson | 43/17 |
| 6,671,994 B1 * | 1/2004 | Klein | 43/17 |
| 6,688,033 B2 * | 2/2004 | Shaff et al. | 43/17 |
| 6,759,955 B2 * | 7/2004 | Koneff et al. | 340/539.1 |
| 6,775,523 B2 * | 8/2004 | Bentley | 340/539.1 |
| 6,891,479 B1 * | 5/2005 | Eccleston | 340/686.1 |
| 2002/0066221 A1 * | 6/2002 | Johnson | 43/17 |
| 2003/0145508 A1 * | 8/2003 | Pieczynski | 43/17 |

FOREIGN PATENT DOCUMENTS

| | | | |
|---|---|---|---|
| GB | 2408907 A * | 6/2005 | |
| JP | 8-9859 A * | 1/1996 | |

* cited by examiner

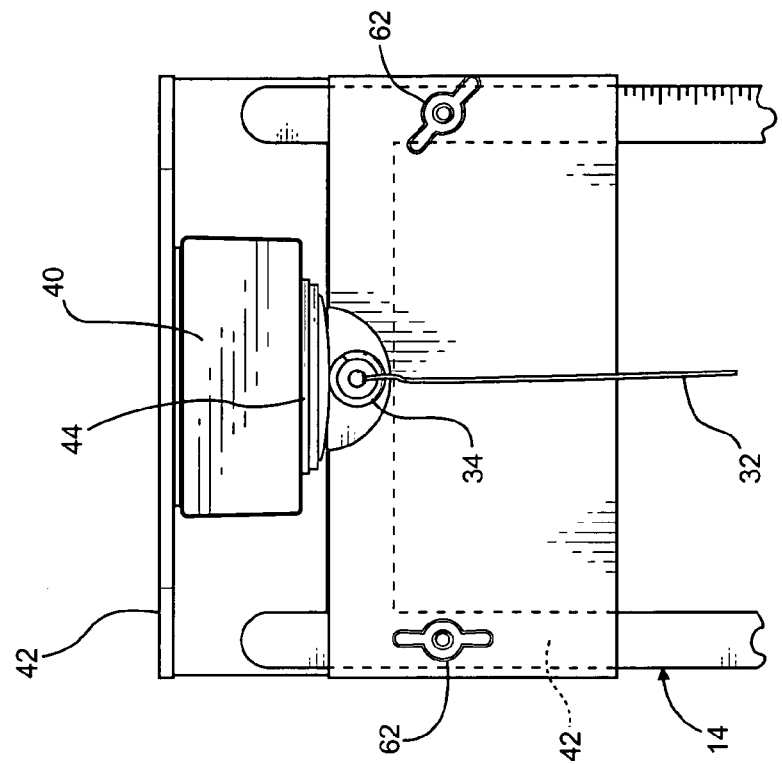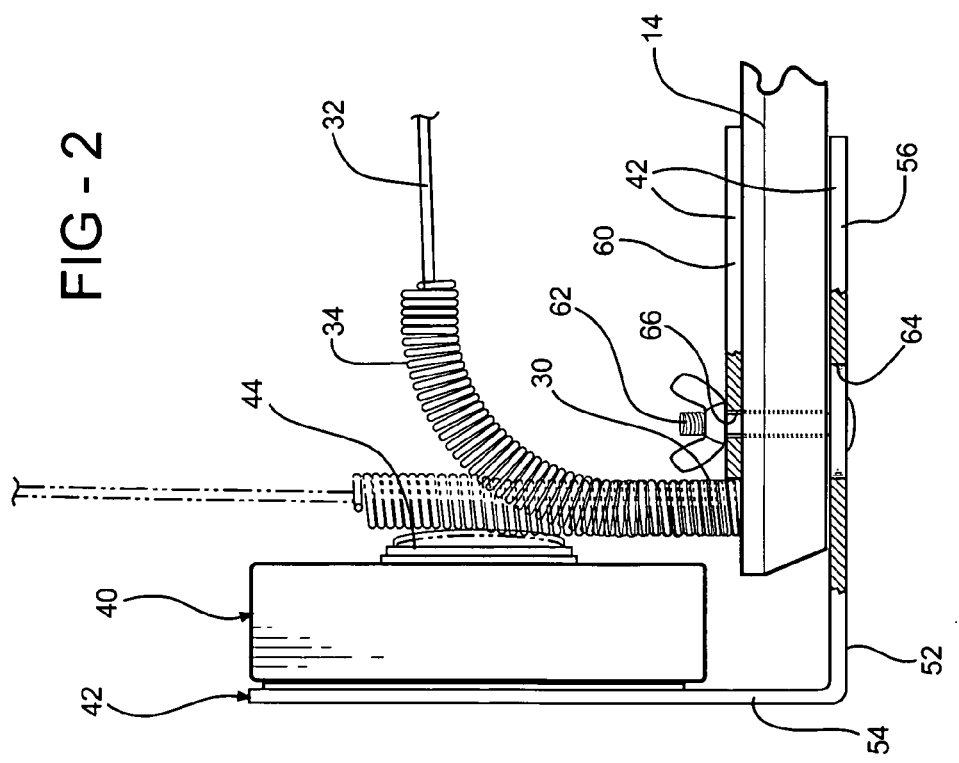

TIP-UP DEVICE

This application claims priority to U.S. Provisional Patent Application No. 60/542,110, filed Feb. 4, 2004.

BACKGROUND OF THE INVENTION

1. Technical Field

This invention relates generally to tip-up fishing devices, and more particularly to signaling systems for such devices operative to signal a fisherman that a fish has struck the tip-up device.

2. Related Art

Various indicating devices are known to the art for signaling a fisherman to the event of a fish striking a tip-up fishing device. The standard device employed with most tip-up fishing rigs is in the form of a flag carried on an elastic flag pole which is held in a bent over ready position until such time as a fish strikes which actuates a trip mechanism that releases the flag and allows it to spring to an upright position and thereby visually alerting the fisherman that a fish has struck.

One of the advantages of a tip-up device is that the fisherman does not need to continually tend the rig in order to fish, and thus relies on the action of the flag to alert the fisherman to a strike. However, the fisherman may not always be in sight of the flag and may check it only periodically to see if the flag is raised. As such, the fisherman stands to lose an opportunity to catch any fish that strike in the interim.

Various prior art devices have been devised to provide some means of alerting the fisherman to the occurrence of a fish strike by other than the flag pole itself. For example, U.S. Pat. No. 4,928,419 discloses a mercury switch that is carried on the flag pole which transmits a signal to a remote receiver when moved to an upright position. U.S. Pat. No. 5,097,618 shows a similar device in which a magnet is clipped to the flag of the flag pole and is pulled free from a receiver to open a switch when the pole is released by a fish strike. Both such devices mount all or part of the transmitter device on the flag pole.

U.S. Pat. No. 4,996,788 discloses another such device in which a transmitter is mounted on the tip-up frame and is fitted with an electrical contact which engages a metal coil of the flag pole when it springs to an upright position to close a circuit and transmit a signal to a remote receiver. However, under conditions of heavy snow, freezing rain, or the like, such a device could fail to work since as snow or ice would build up on either the flag pole or electrical contact, it would impair or completely disrupt the metal to metal contact needed to close the circuit.

It is an object of the present invention to overcome or greatly minimize the disadvantages of the known prior art.

SUMMARY OF THE INVENTION AND ADVANTAGES

A tip-up fishing device includes a cross frame having a generally horizontally positionable first frame section adapted to span a hole cut in ice and a generally vertically positionable frame section operatively coupled to the first frame section and having a lower end region adapted to extend down into the hole. A spool is carried on the lower end region of the second frame section for supporting a length of fishing line. A trip device is operatively and engagable with the fishing line to be operated in response to a strike on the fishing line. An elastic flag pole is mounted on the first frame section and is spring-biased to an upright position. The flag pole is manually positionable to a bent-over position and the trip device is operative to hold the flag pole in the bent over position until such time as the line is struck whereby the trip device operates to release the flag pole enabling it to spring to the upright position. A push button transmitter switch is mounted on the frame adjacent the flag pole in position to be out of operative engagement with the flag pole when the flag pole is positioned in the bent over position, and to be engaged and depressed by the flag pole upon movement of the upright position to transmit a signal. A receiver is remotely positionable relative to the push button transmitter switch for receiving the signal and generating an alarm signal detectable by a fisherman to indicate a strike.

The tip-up device according to the invention thus has the advantage of providing a remote signal system that operates by means of a push button switch mounted on the frame and engagable by the flag pole when the goal is sprung upright.

The push button transmitter switch does not rely on direct electrical contact between the pole and the switch to operate and thus is not susceptible to interruption of the electrical circuit by the build up of snow or ice that can impair other remote systems.

The invention has the further advantage of being readily installed and can operate with both metallic and non-metallic flag pole systems since the pole itself does not form part of an electrical circuit.

The remote strike indicator system is further readily adaptable to any of a number of existing tip-up devices and thus can be incorporated with very little modification to the existing tip-up device.

THE DRAWINGS

Wherein:

FIG. 2 is an enlarged fragmentary elevation view, shown partially in section, showing further features of the push-button transmitting switch and its interaction with the flag pole; and FIG. 3 is a top plan view of FIG. 2.

DETAILED DESCRIPTION

Figure 1:
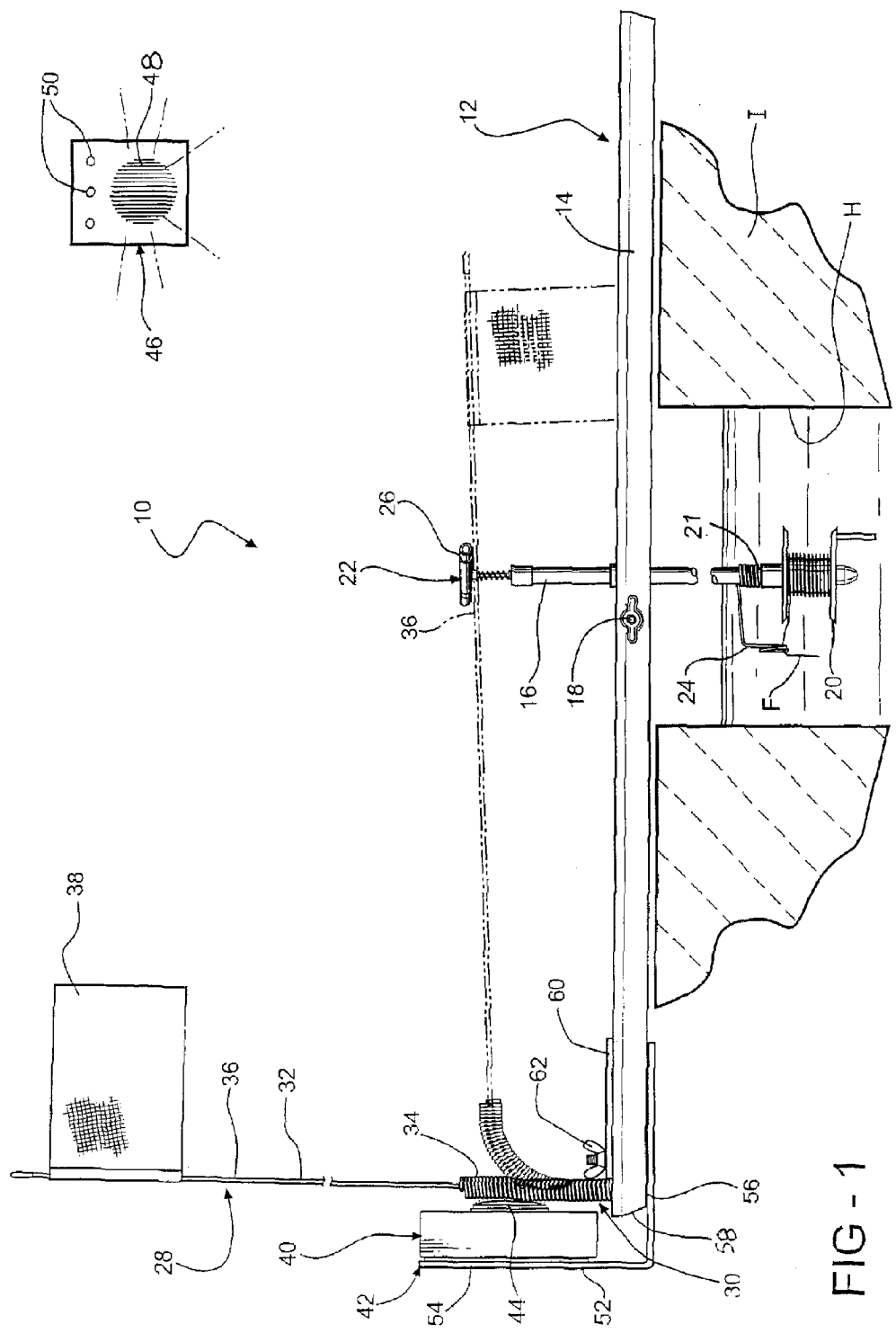
FIG. 1 is a schematic side elevation view of a tip-up device constructed according to the present invention with the push-button transmitting switch in the depressed condition.

The present invention provides a tip-up fishing device equipped with a strike indicator which provides a signal to a fisherman at a location remote from the tip-up device that a fish has struck.

Referring now to the drawings, the tip-up device is shown generally at 10 and includes a cross frame 12 having a horizontal positionable first frame section 14 and a vertically positionable frame section 16 joined intermediate their ends by a pivot connection 18. A spool 20 is mounted for rotation to a lower end 21 of the vertical section 16 below the horizontal section 14. A fishing line F is wound about the spool 20 for securing a hook or other bait at its free end used to lure fish to strike the bait in known matter. A mechanical trip device 22 is supported by the vertical section 16 and has a trigger end 24 adjacent the spool 20 and an opposite catch end 26. A flag strike indicator 28 is mounted on the horizontal section 14 adjacent one end thereof at a base 30 of the flag strike indicator 28 spaced from the vertical section 16. The flag strike indicator includes a flag pole 32 that is fitted at the base end 30 with a coil spring 34 and at its opposite free end with a latch section 36. A flag 38 or other visual indicator is carried on the flag pole 32 adjacent the free end.

The tip-up device 10 thus far described is of conventional construction. The present invention is an improvement on the standard tip-up device. In operation, a fisherman baits the hook and unreels the desired length of line from the spool 20 which is introduced to the water through a hole H cut in the ice I. The trip device 22 is then set by manually bending the flag pole 32 against the elastic return force of the spring 34 from a generally upright vertical position (solid lines of FIG. 1) to a bent-over position (broken lines of FIG. 1) extending toward the vertical section 16, and latching the flag pole 32 in the bent-over position by the catch end 26 of the trip device 22. Once set, the spool 20 and lower end 21 of the vertical section 16 are lowered into the water through the hole H and supported by the horizontal section 14 spanning the hole H and resting on the top surface of the ice I.

When a fish strikes the bait, the trip device 22 moves and releases the flag pole 32 causing it to return upright under the return force of the spring 34 to visually indicate to a fisherman that a fish has struck the bait. In the illustrated embodiment, a fish strike causes the catch end 26 to rotate through corresponding rotation of the spool 20.

According to the present invention, such a tip-up device is enhanced with the addition of a remote electronic strike indicator. As shown in the drawings, an actuator in the preferred form of an electronic push-button transmitter switch 40 is mounted on the horizontal section 14, preferably by a bracket 42, adjacent the base 30 of the flag strike indicator 28. The switch 40 has a depressible button 44 that is biased outward to an undepressed condition corresponding to a "off" position of the switch, but depressible under the force of a return spring to a "on" position of the switch. The switch 40 is located in close proximity to the return spring 34, such that when the flag strike indicator 28 is bent over and secured by the catch end 26 of the trip device 22, the button 44 of the actuator 40 is maintained in the undepressed "off" condition. However, upon release of the flag pole 32 in response to a fish strike, the button 44 is located in the return path of the flag pole 32 as it returns to the upright condition and is contacted by the spring 34 as it returns upright, causing the button 34 to be depressed and held in the "on" position of the switch 40.

Depressing the button 40 to the "on" position generates a signal that is picked up by a receiver 46 which is physically unattached and remote from the actuator 40 and cross frame 12 of the device 10. Depending upon the particular actuator and receiver combination chosen, the receiver 46 can be located at a distance several feet from the actuator 40. For example, the receiver 46 could be located within an ice shanty where the fisherman may be sitting at a distance of 0 to 100 yards away from the location of the tip-up device 10. The receiver 46 is equipped with an audible indicator 48, such as an alarm and, if desired, a visual indicator 50, such as a blinking light to signal to the fisherman in the ice shanty or other remote location that a fish has struck the tip-up device. The receiver 46 could also respond by vibrating, if so desired. When the alarm sounds, a quick check of the location of the flag strike indicator 28 to additional confirm a strike can be made by the fisherman who can then go out and attend to the tip-up device 10.

According to a preferred embodiment, the actuator and receiver can comprise a wireless doorbell device, wherein the door switch is mounted on the tip-up device and the doorbell is located remotely and preferably battery-operated.

It will be appreciate that different ring tones could be used in association with several tip-up devices to indicate, audibly, which of the tip-up devices has a fish strike. This could be achieved by having a single receiver capable of producing a variety of ring tones in association with a plurality of actuators located on the various tip-up devices, or a different receiver associated with each actuator with an identifiably unique ring tone for each actuator.

The bracket 42 mounts the switch 40 securely, but releasably on the frame 12. The bracket 42 includes a generally L-shaped bracket member 52 having an upright leg 54 on which the switch 40 is mounted, and a horizontal leg 56. The horizontal leg 56 underlies the frame 12 and extend out beyond an end 58 of the frame 12 adjacent the base 30 of the flag strike indicator 28, as illustrated in all of the drawings. The horizontal leg 56 transitions at a location spaced outwardly of the frame end 58 to the upright leg 54, where the bracket 52 is bent upwardly. The upright leg 54 is spaced from the flag pole 32 and associated spring 34 and mounts the push-button transmitter switch 40 on an inward face thereof such that the button 44 of the switch 40 faces the pole 32.

The bracket 42 further includes a mounting bracket member 60 which overlies the frame 12 opposite the horizontal leg 56. The bracket 42 also includes at least one and preferably at least a pair of fasteners 62 which extend through aligned openings 64, 66 in the bracket members 56, 60, respectfully. The fasteners 62 may further extend through aligned openings in the frame 12. The openings 64 in the L-shaped bracket member 56 are preferably elongated or slotted in the longitudinal direction of the frame 12 to enable the L-shaped bracket member to slide relative to the frame 12 in order to adjust the position of the upright leg 54, and thus the button 44 of the switch 40 relative to the flag pole 32. As previously described, the button 44 is to be positioned such that it is depressed by the flag pole 32 when released to its upright portion and undepressed when the flag pole 32 is moved to the bent-over "ready" position. The adjustment of the L-shaped bracket 52 enables precise positioning o the button 44. Once the proper location is determined, the fasteners 62 are tightened to secure the button 44 in position relative to the flag pole 32.

The bracket 42 enables the switch 40 to be mounted as a kit with the remote receiver 46 on any of a number of different tip-up devices so long as they include a spring elastic flag pole that springs to an upright position when a fist strikes and can accommodate the mounting of the push-button switch 40 on the frame adjacent a base of the flag pole.

Obviously, many modifications and variations of the present invention are possible in light of the above teachings. It is, therefore, to be understood that within the scope of the appended claims, the invention may be practiced otherwise than as specifically described.

What is claimed is:

1. A tip-up fishing device for catching fish through a hole in a surface of ice, comprising:

a cross frame having a generally horizontally positionable first frame section a adapted to span the hole in the ice, and a generally vertically positionable second frame section operatively coupled to said first frame section and having a lower end region adapted to be extended down into the hole;

a spool carried on said lower end region of said second frame section for supporting a length of fishing line;

a trip device operatively engageable with the fishing line to be operated in response to a strike on the fishing line;

an elastic flag pole mounted on said first frame section and spring-biased to an upright position, said flag pole being manually positionable to a bent-over position, said trip device operative to hold said flag pole in said bent-over position until such time as the line is struck whereby the trip device operates to release said flag pole enabling it to spring to said upright position;

a push button transmitter switch mounted on said frame adjacent said flagpole in position to be out of operative engagement with said flag pole when said flag pole is positioned in said bent-over position, and to be engaged and depressed by said flag pole upon movement to said upright position to transmit a signal;

a receiver remotely positionable relative to said push button transmitter switch for receiving said signal and generating an alarm signal detectable by the fisherman to indicate a strike with said bracket including a generally L-shaped bracket member, said push button transmitter switch being secured to one leg of said L-shaped bracket, the other leg of said L-shaped bracket member being secured to said frame, said push button transmitter switch being supported by said L-shaped bracket member in cantilevered fashion relative to said frame, and wherein said other leg of said L-shaped bracket member underlies said first frame section of said cross frame.

2. The device of claim 1 wherein said bracket includes a clamping bracket member overlying said first frame section opposite said other leg of said L-shaped bracket member.

3. The device of claim 1 wherein said bracket includes at least one fastener for mounting said L-shaped bracket member and said clamping bracket member removeably on said first frame and in secured relation to one another.

4. The device of claim 1 wherein said flag pole is mounted at a base to said first frame section adjacent one end of said first frame section.

5. The device of claim 4 wherein said push button transmitter switch is mounted off said end of said first frame section and is adjustable in position toward and away from said flag pole.

6. A tip-up fishing device for catching fish through a hole in a surface of ice, comprising:

a cross frame having a generally horizontally positionable first frame section adapted to span the hole in the ice, and a generally vertically positionable second frame section operatively coupled to said first frame section and having a lower end region adapted to be extended down into the hole;

a spool carried on said lower end region of said second frame section for supporting a length of fishing line;

a trip device operatively engageable with the fishing line to be operated in response to a strike on the fishing line;

a flag pole having a spring at a lower end thereof mounted on said first frame section and spring-biased to an upright position, said flag pole being manually positionable to a bent-over position, said trip device operative to hold said flag pole in said bent-over position until such time as the line is struck whereby the trip device operates to release said flag pole enabling it to spring to said upright position;

a push button transmitter switch mounted on said frame adjacent said spring of said flagpole in position to be out of operative engagement with said spring when said flag pole is positioned in said bent-over position, and to be engaged and depressed by said spring upon movement to said upright position to transmit a signals; and a receiver remotely positionable relative to said push button transmitter switch for receiving said signal and generating an alarm signal detectable by the fisherman to indicate a strike.

7. The device of claim 6 wherein said push button transmitter switch is supported by said L-shaped bracket member in cantilevered fashion relative to said frame.

8. The device of claim 7 wherein said other leg of said L-shaped bracket underlies said first frame section of said cross frame.

* * * * *